(12) United States Patent
Wu et al.

(10) Patent No.: US 7,188,234 B2
(45) Date of Patent: Mar. 6, 2007

(54) RUN-AHEAD PROGRAM EXECUTION WITH VALUE PREDICTION

(75) Inventors: Youfeng Wu, Palo Alto, CA (US); Tin-Fook Ngai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 779 days.

(21) Appl. No.: 10/017,793

(22) Filed: Dec. 12, 2001

(65) Prior Publication Data

US 2003/0110366 A1  Jun. 12, 2003

(51) Int. Cl.
*G06F 9/312* (2006.01)
(52) U.S. Cl. ..................................... 712/225
(58) Field of Classification Search ............... 712/225
See application file for complete search history.

(56) References Cited

U.S. PATENT DOCUMENTS 6,757,811 B1 * 6/2004 Mukherjee ................. 712/220

OTHER PUBLICATIONS

Improving CC-NUMA Performance Using Instruction-base Prediction; Kaxiras, S and Goodman, JR; Jan. 9-13, 1999; High Performance Computer Architecture, 1999. pp. 161-170.*
The American Heritage Dictionary of the English Language, 1992, Houghton Mifflin Company, Third Edition, the term "predict".*
Rotenberg et al., Trace Processors, Thirtieth Annual IEEE/ACM International Symposium on Microarchitecture, Dec. 1-3, 1997, pp. 138-148.*
Sundarmoorthy et al., Multipath Execution on Chip Multiprocessors Enabled by Redundant Threads, Technical Report CESR-TR-01-2, Oct. 23, 2001, pp. 1-19.*
Rotenberg, AR-SMT: A Microarchitectural Approach to Fault Tolerance in Microprocessors, 29th Annual International Symposium on Fault-Tolerant Computing, Jun. 15-18, 1999, pp. 84-91.*
Collins, J.D., et al., "Speculative Precomputation: Long-range Prefetching of Delinquent Loads", *IEEE/ISCA*, 12 p., (2001).
Fu, C., et al., "Value Speculation Scheduling for High Performance Processors", *ASPLOS VII*, pp. 262-271, (1998).
Lipasti, M.H., et al., "Value Locality and Load Value Prediction", *ASPLOS VII*, pp. 138-147, (1996).
Luk, C., "Tolerating Memory Latency through Software-Controlled Pre-Examination in Simultaneous Multithreading Processors", *IEEE/ISCA*, 12 p., (2001).

(Continued)

*Primary Examiner*—William M. Treat
(74) *Attorney, Agent, or Firm*—Crystal D. Sayles

(57) ABSTRACT

A data processing apparatus, a computer, an article including a machine-accessible medium, and a method of processing data are disclosed. The data processing apparatus may include a pair of pipelines sharing an instruction cache, data cache, and a branch predictor with the second pipeline running ahead of the first pipeline using a data value prediction module. The pipelines may be included in one or more processors and coupled to a memory to form a computer. The method includes executing a plurality of instructions using the pipeline pair, such that when a cache miss is encountered by the second pipeline during execution of a LOAD instruction, the data value prediction module supplies a predicted load value in lieu of a cached value, enabling continued execution of the plurality of instructions by the second pipeline without waiting for the return of the cached value.

18 Claims, 2 Drawing Sheets

OTHER PUBLICATIONS

Purser, Z., et al., "A Study of Slipstream Processors", *IEEE/ACM Int'l Symp. on Microarch., Proc. 33rd Annual*, pp. 269-280, (2000).

Wang, K., et al., "Highly Accurate Data Value Prediction", *IEEE/ACM Int'l Symp. on Micro Arch., Proc. 30th Annual*, pp. 358-363, (1997).

Zilles, C., et al., "Execution-based Prediction using Speculative Slices", *IEEE/ISCA*, 12 p., (2001).

Zilles, C.B., et al., "Understanding the Backward Slices of Performance Degrading Instructions", *ISCA Int'l Symp. of Comp. Architecture*, pp. 172-181, (2000).

* cited by examiner

RUN-AHEAD PROGRAM EXECUTION WITH VALUE PREDICTION

FIELD OF THE INVENTION

The present invention relates generally to apparatus and methods used to speed up the processing of data. More particularly, the present invention relates to the use of value prediction as a way of increasing performance within a data processing environment.

BACKGROUND INFORMATION

The computer industry constantly strives to provide hardware and software which perform according to the increasing expectations of consumers. One aspect of improved computer performance involves the speed at which instructions and data can be accessed. The more quickly instructions and data can be retrieved from main memory, and the more quickly data can be stored to main memory, the more efficiently a computer operates.

Data caches serve to maintain frequently-accessed data values, so that a processor can load and store them much more quickly than would be possible by interacting directly with the main memory. Instruction caches serve a similar purpose, maintaining one or more series of instructions which are frequently used during the execution of a given program.

While the use of cache storage speeds up execution significantly, it is not without problems. All caches are limited in size, and eventually, a data value or instruction must be retrieved directly from main memory because it is not located in the cache store. This is known as a cache "miss", and results in the time-consuming operation of waiting for the cache to interact directly with main memory.

Performance can also be improved by pipelining the execution of instructions, so that several instructions are executed at approximately the same time. However, when branch instructions are processed, pipeline performance can be severely degraded, as the pipeline must wait for determination of the branch instruction result. In the search for ever higher levels of performance, research has been conducted in the area of predicting branch results instead of waiting for the branch instruction to be completed, using a branch predictor to store predicted values, for example. However, whenever a branch value is predicted incorrectly, even more performance is lost.

For the purposes of this document, branch mispredictions and cache misses will be known as "long latency events", and the instructions which cause them to occur will be known as "performance degrading long latency instructions". To avoid the occurrence of long latency events, the idea of executing them ahead of main program execution has emerged. Thus, executing a main program thread, along with a run-ahead thread allows long latency event to be resolved ahead of the main program execution.

A fundamental problem then arises: the run-ahead thread itself should not be slowed by the existence of long latency events. Otherwise, execution of the main program thread may quickly catch up to the run-ahead thread. An analytical model may be used to explain the significance of the problem.

Assume that resolving long latency events (i.e., branch mispredictions, and data and instruction cache misses) takes a portion K of the total number of execution cycles. Further, assume that some portion S of the total number of execution cycles is required to ensure proper execution of performance degrading long latency instructions. If the run-ahead thread must wait for cache misses, the run-ahead thread will take the portion K+S of the total execution cycles to do its job. Thus, the performance increase which might be achieved is about $1/\max(1-K, K+S)$. Assuming that S=20% and K=40% (those skilled in the art will realize that K may easily change based on the type of program and execution environment), the increase is limited to 1.67, or 67%. If K is increased to 50%, which should give more time to further improve performance, the theoretical performance increase in fact degrades to 1.43 times, or 43%. Since the value of K is often greater than 40% in actual program execution, it appears that a single run-ahead execution thread which must wait for the resolution of long latency events has a limited performance potential.

To resolve this problem, multiple run-ahead execution threads can be implemented. Examples of this solution are given by J. Collins, et al., in "Speculative Precomputation: Long-range Prefetching of Delinquent Loads," published in the proceedings of the International Symposium of Computer Architecture, 2001; by C. Zilles and G. Sohi in "Execution-based Prediction Using Speculative Slices," published in the proceedings of the International Symposium of Computer Architecture, 2001; and by C. Luk in "Tolerating Memory Latency Through Software-Controlled Pre-Execution in Simultaneous Multithreading Processors," also published in the proceedings of the International Symposium of Computer Architecture, 2001. However, multiple threads incur performance penalties of their own, including thread management and context switching. In addition, the portions of program execution required for different long latency events often overlap. Simultaneous execution in this case is redundant.

Therefore, there is a need in the art for an apparatus, an article including a machine-accessible medium, a computer, and a method of processing data which reduce the effect of long latency events on data processing using run-ahead execution. This need is especially acute with regard to pipelined data processing as it is affected by branch instruction misprediction, and instruction/data cache misses.

DESCRIPTION OF THE PREFERRED EMBODIMENTS

Figure 1:
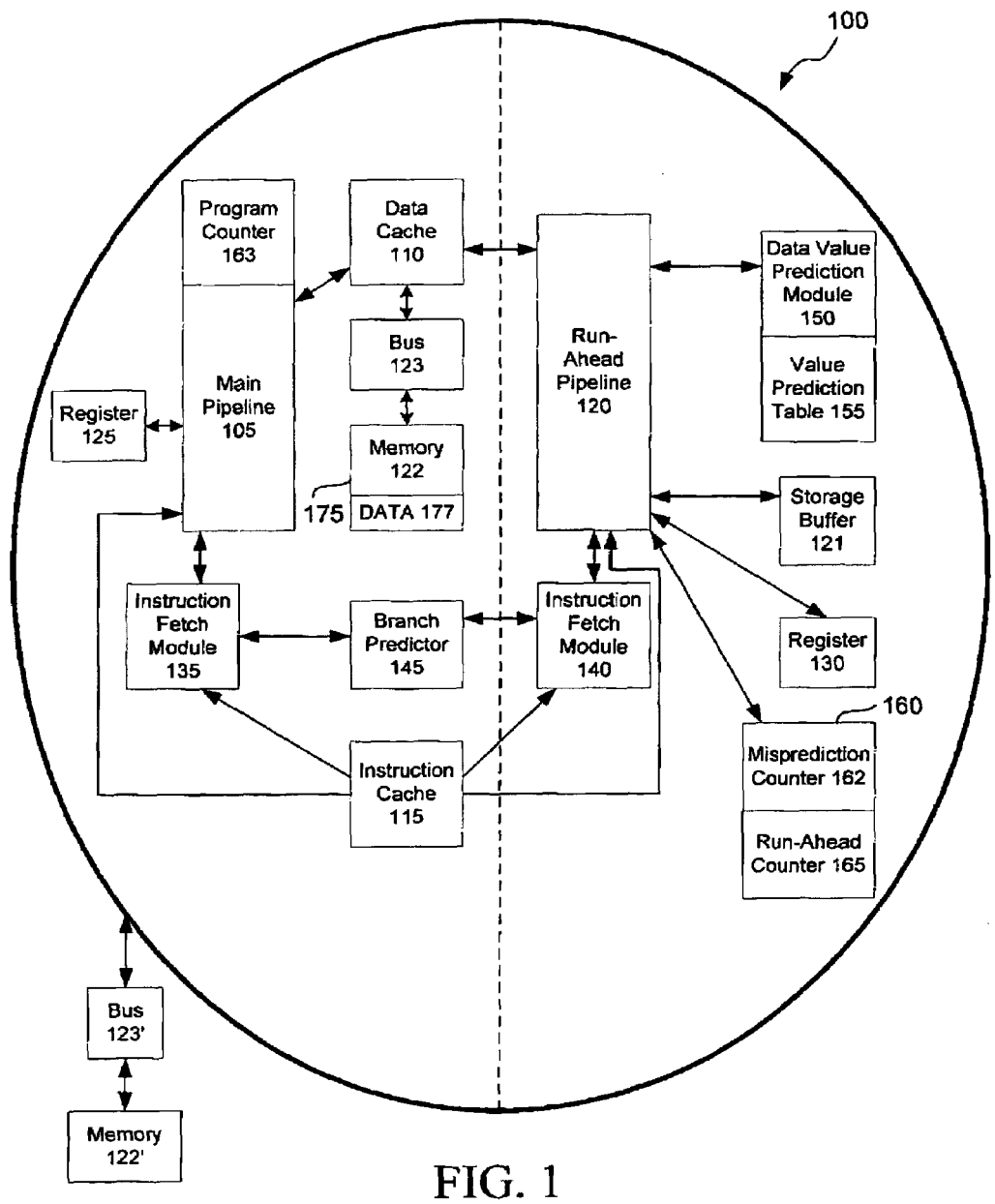
FIG. 1 is a block diagram of an apparatus, an article including a machine-accessible medium, and a computer according to an embodiment of the present invention.

In the following detailed description of the invention, reference is made to the accompanying drawings which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in the art to practice the invention. Other embodiments may be utilized and derived therefrom, such that structural and logical substitutions and changes may be made without departing from the scope of the invention. The following detailed description, therefore, is not to be taken in a limiting sense, and the scope of the invention is defined only by the appended claims, along with the full range of equivalents to which such claims are entitled.

Values loaded from memory are frequently predictable. Load value prediction techniques include methods similar to, or identical to, those described by M. H. Lipasti, et al. in "Value Locality and Load Value Prediction," published in the proceedings of the ACM Seventh International Conference on Architectural Support for Programming, pp. 226–237, 1986; and by K. Wang and M. Franklin in "Highly Accurate Data Value Prediction Using Hybrid Predictors," published in the Proceedings of the Thirtieth Annual IEEE/ACM International Symposium on Microarchitecture, pp. 281–290, 1987.

The inventive approach to solving the problems presented above makes use of data value prediction to alleviate the effects of data cache misses with respect to run-ahead execution threads. In practice, whenever a cache miss event occurs during execution of the run-ahead thread, the load value may be supplied as a predicted value, rather than an actual value retrieved from memory. If the prediction is correct most of the time, the theoretical increase in performance is about 1/(1−K), or about 2 times (200%) if K=50%. When K>80%, such as might occur during execution some of the SPEC CPU2000 benchmark suite produced by the Standard Performance Evaluation Corporation, performance may be improved by a factor of 5 times (500%), or more.

While value prediction may generate overhead for the run-ahead execution thread, the mechanism is similar to branch prediction, in that it may be implemented as part of the processor pipeline without generating additional pipeline stalls. This is so because the scheme of the present invention is speculative, and tolerates prediction errors. That is, incorrectly predicted load values produced by the run-ahead execution thread will not hinder the main execution thread, as none of the speculative results are stored to memory, or the data cache. Rather, predicted values are merely used to assist the main execution thread, using the cache prefetching effect achieved by the run-ahead thread.

FIG. 1 is a block diagram of an apparatus, an article including a machine-accessible medium, and a computer according to an embodiment of the present invention. In one embodiment of the invention, the data processing apparatus 100 may include a first (main) pipeline 105, used for execution of the main program thread. The main pipeline 105 may include and/or be coupled to a data cache 110 and an instruction cache 115. The apparatus also may include a second pipeline (i.e., the "run-ahead" pipeline) 120, used to execute the run-ahead thread. The run-ahead pipeline 120 may also be coupled to the data cache 110 and the instruction cache 115. Thus, the data cache 110 and the instruction cache 115 may both be shared by the main pipeline 105 and the run-ahead pipeline 120. Cache sharing allows the run-ahead pipeline 120 to resolve cache miss events prior to being encountered by the main pipeline 105. The run-ahead pipeline 120 may be coupled to a storage buffer 121, which is used to hold stored values for use by the run-ahead pipeline 120. The storage buffer 121 may take the form of a cache. While the data cache 110 may also be coupled to a main memory 122 (which may be implemented as an internal memory 122 or external memory 122' coupled to an internal bus 123 or external bus 123'), it should be noted that the run-ahead pipeline 120 never stores data values to the main memory 122. Only the main pipeline 105 may operate so as to store data values to the main memory 122, typically using the data cache 110.

Each pipeline 105, 120 may include and/or be coupled to a separate register file 125, 130 respectively. Similarly, each pipeline 105, 120 may be coupled to a separate instruction fetch module 135, 140, respectively. However, the instruction fetch modules 135, 140 from each pipeline may be coupled to and share a branch predictor 145. As such, the main pipeline 105 and the run-ahead pipeline 120 may both be subject to the effects of branch misprediction. It should also be noted that the pipeline pair 105, 120 may be included in a single processor, along with the instruction and data caches, if desired. Alternatively, each pipeline 105 and 120 may be incorporated into a separate processor.

A data value prediction module 150, coupled to the second pipeline, may also be included in the apparatus 100. The value prediction module 150 may exist as a separate module, as part of a processor including the main pipeline 105, as part of another processor including the run-ahead pipeline 120, or as an element of a single processor including the pipeline pair 105, 120. To track and store the predicted data values, a value prediction table 155 may be coupled to the value prediction module 150.

As noted previously, in accordance with the present invention, neither the run-ahead pipeline 120, nor the main pipeline depends on perfect predictions being provided by the value prediction module 150. This is because some loaded values have no effect on program flow, such that incorrect predictions affect only future data load values whose addresses depend on the predicted values. This affects only the run-ahead thread. Even so, other loads remain correctly prefetched into the cache 110, and other branches are resolved ahead and incorporated into the branch predictor 145. Only the run-ahead thread makes use of the predicted values. The main execution thread always loads correct values from the cache 110 and main memory 122.

The run-ahead pipeline 120 functions by issuing load operations to the data cache 110. If there is a cache miss, such that the data to be obtained has not already been loaded from the main memory, the missing value will be predicted using the value prediction module 150. Load value prediction mechanisms are well known in the art. For example, those described in the publications by M. H. Lipasti, et al. and K. Wang and M. Franklin, referenced previously, may be used to implement the function of the value prediction module 150. Thus, instead of waiting for the data cache 110 to load a value from main memory 122 when a data cache miss occurs, the run-ahead pipeline 120 may continue execution of the run-ahead thread using the predicted value. Of course, the predicted values are never stored to the memory 122. However, as will be discussed later, predicted values may be stored in the table 155. Since the run-ahead pipeline 120 never has to wait for the cache to load a value from main memory 122 due to a cache miss, the run-ahead pipeline 120 will run ahead of the main pipeline 105. This enables the run-ahead pipeline 120 to always prefetch data into the data cache 110 before the main pipeline 105 needs the data. As long as the data are prefetched from the correct memory location, the main pipeline 105 will load in the correct load value from the data cache 110 (cache hit) and it will not stall. After some number of initial cache misses are encountered by the main pipeline 105, it will begin to benefit from the prefetching effect provided by the run-ahead pipeline 120. Ideally, the main pipeline 105 should almost catch up to the operation of the run-ahead pipeline 120, while trailing by some nominal number of instructions.

One major benefit of the invention is the ability to predict a value and then use the predicted value in the run-ahead thread so that the speed of the run-ahead thread is not hindered by cache misses. As noted previously, the run-ahead pipeline 120 is subject to branch mispredictions, as is the main pipeline 105. In addition, some instruction cache lines fetched by the run-ahead pipeline 120 will eventually be replaced. Thus, occasionally, the main pipeline 105 will suffer additional cache stalls due to the presence of the run-ahead pipeline 120. The net effect may be that the run-ahead pipeline 120 will at times run even further ahead of the main pipeline 105.

To prevent the run-ahead pipeline 120 from running too far ahead of the main pipeline 105, a synchronization mechanism 160, coupled to the run-ahead pipeline, may be used. For example, the synchronization mechanism 160 may include a misprediction counter 162 coupled to the run-ahead pipeline 120. Alternatively, or in addition, the synchronization mechanism 160 may include a run-ahead counter 165 coupled to the run-ahead pipeline 120.

The misprediction counter 162 may be used to keep track of the number of mispredicted values provided by the value prediction module 150. For example, each time a loaded value is returned to the data cache 110, it may be compared to the previously predicted value retained in the table 155. If the predicted value turns out to be incorrect, the misprediction counter 162 may be incremented. Once the misprediction counter 162 reaches a value which equals, or exceeds some preselected misprediction threshold value, execution of the run-ahead pipeline 120 may be reset so as to begin at the current program counter value 163 maintained by the main pipeline 105.

As an alternative example, the run-ahead counter 165 may be used to monitor the number of instructions which the run-ahead pipeline 120 has executed ahead of the main pipeline 105. Once the run-ahead counter 162 reaches a value which equals, or exceeds some preselected threshold run-ahead value, execution of the run-ahead pipeline 120 may be reset so as to begin at the current program counter value 163 maintained by the main pipeline 105. Of course, other means of synchronization, well known to those skilled in the art, may also be included in the mechanism 160.

It should be noted that the pipelines 105, 120; the caches 110, 115; the register files 125, 130; the instruction fetch modules 135, 140; the branch predictor 145; the value prediction module 150; the table 155; and the synchronization mechanism 160, possibly including a misprediction counter 162 and/or a run-ahead counter 165 may all be characterized as "modules" herein. Such "modules" may include hardware circuitry, such as a microprocessor and memory, software program modules, or firmware, and combinations thereof, as desired by the architect of the apparatus 100, and appropriate for particular implementations of the invention.

In another embodiment of the invention, a computer may include a first processor with a first (main) pipeline 105 having a data cache 110 coupled to a memory 122, and an instruction cache 115. The computer may also include a second (run-ahead) pipeline 120 coupled to the data cache 110 and the instruction cache 115, as well as a data value prediction module 150 coupled to the run-ahead pipeline 120 (which may be included in a second processor. Alternatively, both pipelines 105, 120 may be included in a single processor, which may be coupled to memory 122, 122' using a bus 123, 123'. As noted previously, a value prediction table 155 may be coupled to the value prediction module 150. A misprediction counter 162 and/or a run-ahead counter 165 may also be couple to the run-ahead pipeline 120, as part of a synchronization mechanism 160.

One of ordinary skill in the art will understand that the data processing apparatus of the present invention can be used in applications other than for computers, and thus, the invention is not to be so limited. The illustrations of a data processing apparatus 100 and a computer 170 are intended to provide a general understanding of the structure of the present invention, and are not intended to serve as a complete description of all the elements and features of data processing apparatus and computers which might make use of the structures described herein.

Applications which may include the novel data processing apparatus and computer of the present invention include electronic circuitry used in high-speed computers, device drivers, communication and signal processing circuitry, modems, processor modules, embedded processors, and application-specific modules, including multilayer, multichip modules. Such data processing apparatus and computers may further be included as sub-components within a variety of electronic systems, such as televisions, cellular telephones, personal computers, radios, aircraft, and others.

Figure 2:
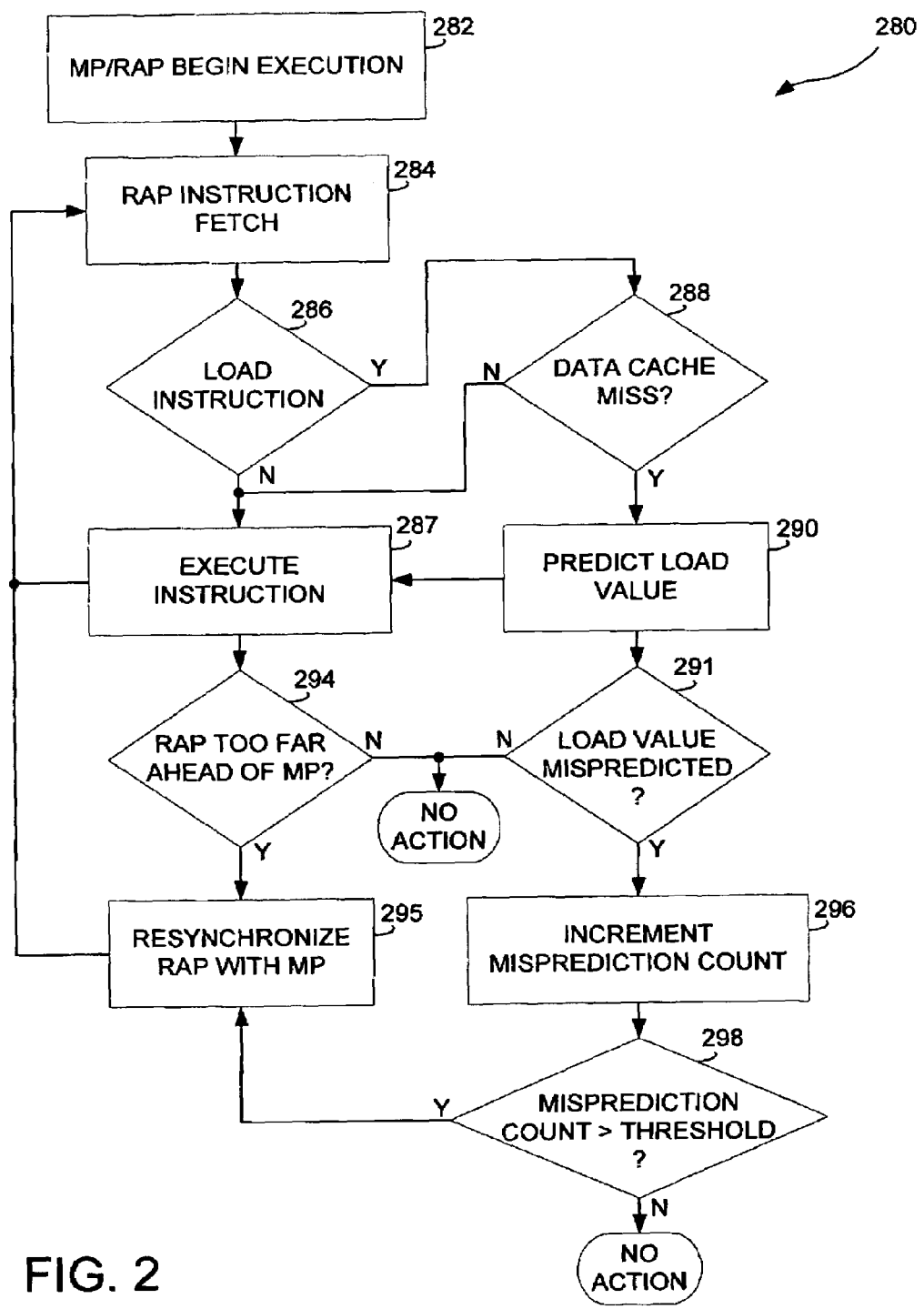
FIG. 2 is flow chart illustrating a method of processing data according to an embodiment of the present invention.

FIG. 2 is flow chart illustrating a method of processing data according to an embodiment of the present invention. Assuming that a program is executed by a main pipeline and an run-ahead pipeline operating in concert (i.e., sharing instruction and data caches as described previously), the method 280 may include each pipeline beginning execution of the program, which contains a plurality of instructions, at the same location within the program (i.e., at the same program counter value) at block 282. The method 280 may also include selecting a misprediction threshold value, and/or a run-ahead threshold value (noted in block 280), perhaps prior to beginning execution of the program.

The method 280 may then proceed with the run-ahead pipeline fetching an instruction, which may be a LOAD instruction, as one of the instructions included in the program, prior to its execution by the main pipeline, at block 284. If the instruction fetched at block 284 is determined not to be a LOAD instruction at block 286, then the instruction can be executed at block 287, and the next instruction can be fetched at block 284.

If it is determined that the instruction is a LOAD instruction at block 286, and if it is determined that executing the LOAD instruction will not produce a cache miss at block 288, then the instruction can be executed at block 287, and the next instruction can be fetched at block 284. However, if it is determined that executing the LOAD instruction will produce a data cache miss at block 288, then a load value will be predicted at block 290, and execution will continue at block 287. In parallel, and some time after the current LOAD instruction is executed, if it is determined that the load value has been predicted correctly at block 291, then no further action will be taken.

After the instruction is executed at block 287, the next instruction will be fetched by the run-ahead pipeline at block 284. In parallel, the run-ahead counter may be checked to determine if the run-ahead pipeline is running too far ahead of the main pipeline (i.e., the run-ahead pipeline is ahead by the same number of instructions, or more, than the run-ahead threshold value selected earlier) at block 294. If the run-ahead pipeline is not running too far ahead of the main pipeline at block 294, then no further action will be taken. Otherwise, if the run-ahead pipeline is determined to be running too far ahead of the main pipeline at block 294, then the run-ahead pipeline may be synchronized to begin executing the program from the same location as the main pipeline (e.g., directing the run-ahead pipeline to execute the program instructions using the same program counter value maintained by the main pipeline) at block 295. Then the run-ahead pipeline may continue to fetch program instructions from the same point in the main execution thread as the main pipeline at block 284.

If the load value is determined to be mispredicted at block 291, then the method 280 may also include counting the number of mispredictions made by the value prediction module at block 296, and determining whether the number of mispredictions is the same as, or exceeds, the misprediction threshold value selected earlier at block 298. If the misprediction threshold is met or exceeded as determined at block 298, then the run-ahead pipeline may be re-synchronized to begin executing the main execution thread from the same location as the main pipeline at block 295. Thereafter, the run-ahead pipeline may continue to fetch program instructions from the same point as the main pipeline at block 284. Otherwise, if the misprediction threshold is not met or exceeded as determined at block 298, then no further action will be taken.

Thus, referring back to FIG. 1, it is now easily understood that another embodiment of the invention may include an article 175, such as a memory system, a magnetic or optical disk, some other storage device, and/or any type of electronic device or system, comprising a machine-accessible medium 122 (e.g., an electrical, optical, or electromagnetic conductor) having associated data 177, which when accessed, results in a machine performing such actions as executing a plurality of instructions (e.g., a program) using a main pipeline and an run-ahead pipeline which share an instruction cache and a data cache. Execution may begin within each pipeline using the same program counter value, and the instructions may include a LOAD instruction.

The actions may include calculating a predicted load value for execution of the LOAD instruction if a cache miss arises due to executing the instruction by the run-ahead pipeline (prior to execution of the LOAD instruction by the main pipeline). Such actions may further include calculating a predicted load value which might be produced by complete execution of the LOAD instruction, and continuing execution of the instructions using the run-ahead pipeline, assisted by the predicted load value.

Other actions may include restarting execution of the instructions by the run-ahead pipeline at a location or program counter value maintained by the main pipeline, as prompted by a synchronizing mechanism. For example, such may be the case if the number of instructions which the run-ahead pipeline has executed ahead of the first pipeline are counted, and the number of instructions counted is greater than or equal to a preselected threshold value. Alternatively, such may also be the case if the number of mispredictions which occur due to predicting load values are counted, and the number of mispredictions counted is greater than or equal to a preselected threshold value.

The apparatus, computer, article, and method of the invention provides an additional tool which can be used by computer system designers and programmers alike to increase data processing efficiency. The use of an run-ahead pipeline, assisted by a data value prediction module, operates to assist the main pipeline in processing a program without the pronounced degradation which might otherwise be experienced due to cache misses encountered by the run-ahead pipeline.

Although specific embodiments have been illustrated and described herein, those of ordinary skill in the art appreciate that any arrangement which is calculated to achieve the same purpose may be substituted for the specific embodiment shown. This disclosure is intended to cover any and all adaptations or variations of the present invention. It is to be understood that the above description has been made in an illustrative fashion, and not a restrictive one. Combinations of the above embodiments, and other embodiments not specifically described herein will be apparent to those of skill in the art upon reviewing the above description. The scope of the invention includes any other applications in which the above structures and methods are used. The scope of the invention should be determined with reference to the appended claims, along with the full range of equivalents to which such claims are entitled.

What is claimed is:

1. A data processing apparatus, comprising:
   a first pipeline having a data cache and an instruction cache;
   a second pipeline coupled to the data cache and the instruction cache;
   a data value prediction module coupled to the second pipeline; and
   a synchronization mechanism coupled to the second pipeline, wherein the synchronization mechanism includes a misprediction counter.

2. The data processing apparatus of claim 1, further comprising:
   a first instruction fetch module coupled to the first pipeline; and
   a second instruction fetch module coupled to the second pipeline.

3. The data processing apparatus of claim 2, further comprising:
   a branch predictor coupled to the first and second instruction fetch modules.

4. The data processing apparatus of claim 1, further comprising:
   a first register file coupled to the first pipeline; and
   a second register file coupled to the second pipeline.

5. The data processing apparatus of claim 1, wherein the first pipeline is included in a first processor, and wherein the second pipeline is included in a second processor.

6. The data processing apparatus of claim 1, wherein the first and second pipelines are included in a single processor.

7. The data processing apparatus of claim 6, wherein the data cache, the instruction cache, and the data value prediction module are included in the single processor.

8. The data processing apparatus of claim 1, further comprising:
   a value prediction table coupled to the value prediction module.

9. The data processing apparatus of claim 1, further comprising:
   a main memory coupled to the data cache, wherein the first pipeline may operate to store a data value to the main memory, and wherein the second pipeline may not operate to store the data value to the main memory.

10. The data processing apparatus of claim 1, further comprising:
    a storage buffer coupled to the second pipeline.

11. An article comprising a tangible computer-readable medium with intructions stored thereon that when executed causes a computer to perform the following:
    executing a plurality of instructions including a LOAD instruction using a first pipeline sharing an instruction cache and a data cache with a second pipeline;
    calculating a predicted load value for execution of the LOAD instruction if a cache miss in the data cache results when the second pipeline executes the LOAD instruction before the first pipeline;

continuing execution of the plurality of instructions using the second pipeline;

counting a number of mispredictions occurring when the predicted load value is incorrect; and restarting execution of the plurality of instructions by the second pipeline at a program counter value maintained by the first pipeline if the number of mispredictions is greater than or equal to a preselected threshold value.

12. The article of claim 11, wherein the tangible computer-readable medium further causes the computer to perform the following:

beginning execution of the plurality of instructions by the first and second pipelines at a same program counter value.

13. A method of processing data, comprising:

executing a plurality of instructions including a LOAD instruction using a first pipeline sharing an instruction cache and a data cache with a second pipeline;

calculating a predicted load value for execution of the LOAD instructions if a cache miss in the data cache results when the second pipeline executes the LOAD instruction before the first pipeline;

continuing execution of the plurality of instructions using the second pipeline;

counting a number of mispredictions occurring when the predicted load value is incorrect; and restarting execution of the plurality of instructions by the second pipeline at a program counter value maintained by the first pipeline if the number of mispredictions is greater than or equal to a preselected threshold value.

14. The method of claim 13, further comprising:

beginning execution of the plurality of instructions by the first and second pipelines at a same program counter value.

15. A method of processing data, comprising:

executing a plurality of instructions including a LOAD instruction using a first pipeline sharing an instruction cache and a data cache with a second pipeline;

calculating a predicted load value for execution of the LOAD instructions if a cache miss in the data cache results when the second pipeline executes the LOAD instruction before the first pipeline;

counting a number of instructions included in the plurality of instructions which the second pipeline has executed ahead of the first pipeline; and restarting execution of the plurality of instructions by the second pipeline at a program counter value maintained by the first pipeline if the number of instructions is greater than or equal to a preselected threshold value.

16. The method of claim 15, further comprising:

beginning execution of the plurality of instructions by the first and second pipelines at a same program counter value.

17. An article comprising a tangible computer readable medium with instructions stored thereon that when executed cause a computer to perform the following:

executing a plurality of instructions including a LOAD instruction using a first pipeline sharing an instruction cache and a data cache with a second pipeline;

calculating a predicted load value for execution of the LOAD instruction if a cache miss in the data cache results when the second pipeline executes the LOAD instruction before the first pipeline;

counting a number of instructions included in the plurality of instructions which the second pipeline has executed ahead of the first pipeline; and restarting execution of the plurality of instructions by the second pipeline at a program counter value maintained by the first pipeline if the number of instructions is greater than or equal to a preselected threshold value.

18. The article of claim 17, wherein the tangible computer-readable medium further causes the computer to perform the following:

beginning execution of the plurality of instructions by the first and second pipelines at a same program counter value.

* * * * *